US009212924B1

(12) United States Patent
Salowitz

(10) Patent No.: US 9,212,924 B1
(45) Date of Patent: Dec. 15, 2015

(54) MULTIMODE TRANSPORTATION TRANSITIONS

(71) Applicant: Microsoft Technology Licensing, LLC, Redmond, WA (US)

(72) Inventor: Elizabeth Salowitz, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/465,236

(22) Filed: Aug. 21, 2014

(51) Int. Cl.

| | | |
|---|---|---|
| G01C 21/00 | (2006.01) | |
| G01C 21/34 | (2006.01) | |
| G01C 21/36 | (2006.01) | |
| G08G 1/123 | (2006.01) | |
| G08G 1/0968 | (2006.01) | |
| A61H 3/06 | (2006.01) | |

(52) U.S. Cl.
CPC ............ *G01C 21/3423* (2013.01); *A61H 3/061* (2013.01); *G01C 21/34* (2013.01); *G01C 21/3407* (2013.01); *G01C 21/36* (2013.01); *G01C 21/3632* (2013.01); *G01C 21/3644* (2013.01); *G08G 1/096883* (2013.01); *G08G 1/123* (2013.01)

(58) Field of Classification Search
CPC .... G01C 21/34; G01C 21/36; G01C 21/3407; G01C 21/3423; G01C 21/3632; G01C 21/3644; G08G 1/096883; G08G 1/123; A61H 3/061
USPC ......... 701/400, 408, 409, 410, 413, 416, 428, 701/431, 433, 434, 440, 467, 520
See application file for complete search history.

(56) References Cited

U.S. PATENT DOCUMENTS

| | | | | |
|---|---|---|---|---|
| 7,957,871 | B1* | 6/2011 | Echeruo | 701/54 |
| 2005/0021231 | A1* | 1/2005 | Matsuda et al. | 701/211 |
| 2006/0149466 | A1* | 7/2006 | Kikuchi | G01C 21/3423 |
| | | | | 701/420 |
| 2006/0184314 | A1 | 8/2006 | Couckuyt et al. | |
| 2006/0289624 | A1* | 12/2006 | Olmos | A61F 9/08 |
| | | | | 235/375 |
| 2007/0291034 | A1* | 12/2007 | Dones | 345/427 |
| 2008/0262717 | A1* | 10/2008 | Ettinger | 701/206 |
| 2009/0119001 | A1* | 5/2009 | Moussaeiff et al. | 701/200 |
| 2010/0004805 | A1* | 1/2010 | Denis et al. | 701/19 |
| 2010/0109918 | A1* | 5/2010 | Liebermann | G10L 15/26 |
| | | | | 341/21 |
| 2010/0235082 | A1 | 9/2010 | Taniyama et al. | |
| 2010/0268450 | A1* | 10/2010 | Evanitsky | 701/201 |
| 2011/0022304 | A1 | 1/2011 | Lee | |

(Continued)

OTHER PUBLICATIONS

Sami et al., Public transport real time information in personal navigation systems for special user groups, 2004, 11th ITS World congress. Nagoya, Japan.*

(Continued)

*Primary Examiner* — Calvin Cheung
*Assistant Examiner* — Angelina Shudy
(74) *Attorney, Agent, or Firm* — Nicholas Chen; Kate Drakos; Micky Minhas

(57) ABSTRACT

A rich set of inter-transportation-mode transitions can be supported. For example, when generating a route from a starting location to a destination, transitions to or from walking can be included that are immediately discernable by the traveler without reference to compass directions. Further functionality, such as support for multiple doors of a transit vehicle can be supported. An overall improved user experience and fewer errors for travelers who combine different transportation modes into their trips can result.

21 Claims, 11 Drawing Sheets

(56) References Cited

U.S. PATENT DOCUMENTS

| | | |
|---|---|---|
| 2011/0130956 A1* | 6/2011 | Tracton et al. ............... 701/201 |
| 2012/0004841 A1 | 1/2012 | Schunder |
| 2012/0111222 A1* | 5/2012 | Zambelli ................. A63G 7/00 104/53 |
| 2013/0073202 A1 | 3/2013 | Zheng et al. |
| 2013/0200992 A1* | 8/2013 | Kim ...................... A61H 3/061 340/4.11 |
| 2014/0005921 A1* | 1/2014 | Voronel et al. ............... 701/423 |
| 2014/0188788 A1 | 7/2014 | Bridgen et al. |
| 2014/0249747 A1* | 9/2014 | Kosseifi ............ G01C 21/3415 701/428 |
| 2014/0278616 A1* | 9/2014 | Stone et al. ...................... 705/6 |
| 2015/0015024 A1* | 1/2015 | Cremers et al. ............... 296/178 |

OTHER PUBLICATIONS

"Public Transit Directions," https://support.google.com/maps/answer/2585071?hl=en, retrieved Jul. 14, 2014, 2 pages.

Neal, "Apple iOS 8 Rumors: Apple Maps Getting Major Upgrade Including Public Transit Directions," http://www.ibtimes.com/apple-ios-8-rumors-apple-maps-getting-major-upgrade-including-public-transit-directions-1560756, published Mar. 11, 2014, 2 pages.

* cited by examiner

MULTIMODE TRANSPORTATION TRANSITIONS

BACKGROUND

Mobile phones now have functionality and applications that provide useful digital maps. In addition, given a starting point, a route can be generated by which a user can navigate to a destination. Such routes are typically constructed for vehicle drivers and include such instructions as, "Turn left on Main Street." The driver can then easily drive to the desired destination without any prior knowledge of the location.

In addition, multiple modes of transportation are supported so that a single route can include walking, taking a train, taking a bus, and the like. However, support for such multiple modes is limited.

Because travelers can face hurdles when attempting to take advantage of multiple mode routes, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be a method implemented at least in part by a computing device, the method comprising receiving a request to generate a route from a starting location to an ending location; and in response to the request, generating the route, the route comprising a plurality of transportation modes and an inter-transportation-mode transition instruction comprising a compass-free direction to proceed for a transition from a first mode of transportation to a second, different mode of transportation.

An embodiment can be implemented as a system comprising, in one or more computer-readable media, a stored representation of a map comprising information about an inter-transportation-mode transition; and a route generator configured to accept a starting location and destination location, wherein the route generator is further configured to read the stored representation of the map and generate a route from the starting location to the destination location, wherein the route generator is further configured to, based on the information about the inter-transportation-mode transition, output a description of the route comprising an inter-transportation-mode transition instruction comprising a compass-free direction to proceed for a transition from a first mode of transportation to second, different mode of transportation.

An embodiment can be implemented as one or more computer-readable media comprising computer-executable instructions causing a computing device to perform a method comprising, for an inter-transportation-mode transition from a first mode of transportation to a second, different mode of transportation, generating an instruction for inclusion in a route from a starting location to a destination location, wherein generating the instruction comprises generating an indication of one out of a plurality of possible open sides of a vehicle through which to exit; and generating a traveler-centric indication of a direction to travel while walking after exiting the vehicle, wherein the direction to travel is based on an implied orientation of a traveler exiting from the indicated open side of the vehicle.

As described herein, a variety of other features and advantages can be incorporated into the technologies as desired.

DETAILED DESCRIPTION

Example 1

Example Overview

The technologies described herein can be used for a variety of multimode transportation transition scenarios, and adoption of the technologies can provide improved techniques for communicating routes with multimode transitions to travelers. Such routes can be displayed as instructions to a traveler on a user interface to better facilitate travel by the traveler on a determined route. Other features described herein can be implemented to improve transitions between transportation modes. An overall superior user experience with smoother transitions between transportation modes can result.

Various other features can be implemented and combined as described herein.

Example 2

Example System Implementing Inter-Transportation-Mode Transitions

Figure 1:
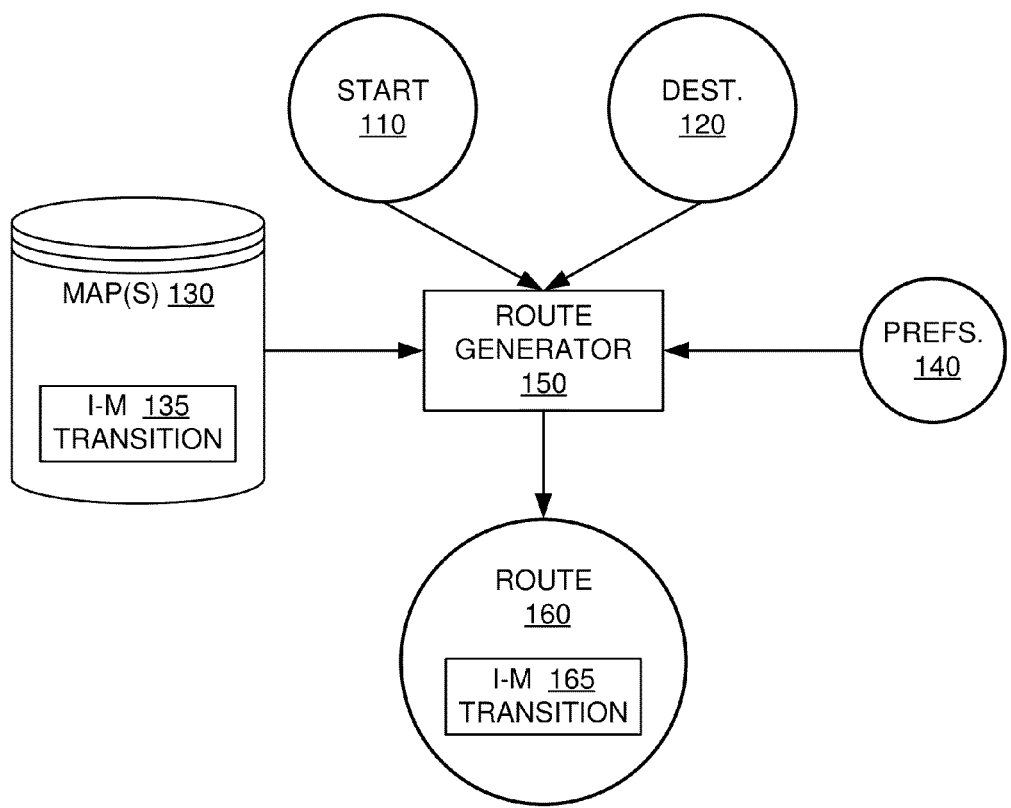
FIG. 1 is a block diagram of an example system implementing inter-transportation-mode transitions.

FIG. 1 is a block diagram of an example system 100 implementing inter-transportation-mode transitions as described herein.

In the example, a route generator 150 receives a start location 110 and a destination location 120 as input. The start location can be implied or take a default value (e.g., to a current location as determined by location technology of a mobile device of a traveler). Similarly, the destination location 120 can be implied or take a default value (e.g., to current search results, a favorite destination, a home destination, or the like).

The route generator 150 is in communication with one or more maps 130 (e.g., a stored representation of a map in one or more computer-readable media) that comprise information about an inter-transportation-mode transition 135. Further, preferences 140 can affect the operation of the route generator 150.

The route generator 150 is configured to generate a route 160 that comprises a description 165 of an inter-transportation-mode transition. Such a description can be generated based on information as described herein. In practice, the route 160 can be specified in human-readable form as instructions to a traveler wishing to navigate from the start location 110 to the destination location 120.

Although various components are shown in separate boxes, in practice, component boundaries may vary. For example, the components can be provided as part of a mobile device operating system, map application, or the like. Other arrangements are possible while still implementing the technologies.

Further, client-server operation can be supported whereby a requesting application on a client mobile device provides input information to a server and receives the route 160 in response. In such a case, the maps 130 may reside outside of the requesting device. However, implementations where the maps 130 are downloaded or preloaded to a local device for consultation can also be supported. Although mobile device implementations are described, fixed location implementations can be supported (e.g., a requesting browser on a home computer accesses a server via the Internet).

In practice, the systems shown herein, such as system 100, can be more complicated, with additional functionality, more inputs, outputs, and the like. In practice, additional functionality related to location (e.g., GPS, indoor positioning technology, or the like) can be included to determine a current location of a device employed by a traveler to obtain directions. Additionally, a specialized mapping device primarily or fully dedicated to providing map functionality, including the route generation described herein, can implement the described technologies.

The system 100 and any of the other systems described herein can be implemented in conjunction with any of the hardware components described herein, such as the computing systems or mobile devices described below (e.g., comprising one or more processors, memory, and the like). In any of the examples herein, the inputs, outputs, preferences, generators, maps and applications can be stored in one or more computer-readable storage media or computer-readable storage devices. The technologies described herein can be generic to the specifics of operating systems or hardware and can be applied in any variety of environments to take advantage of the described features.

Example 3

Example Method Implementing Inter-Transportation-Mode Transitions

Figure 2:
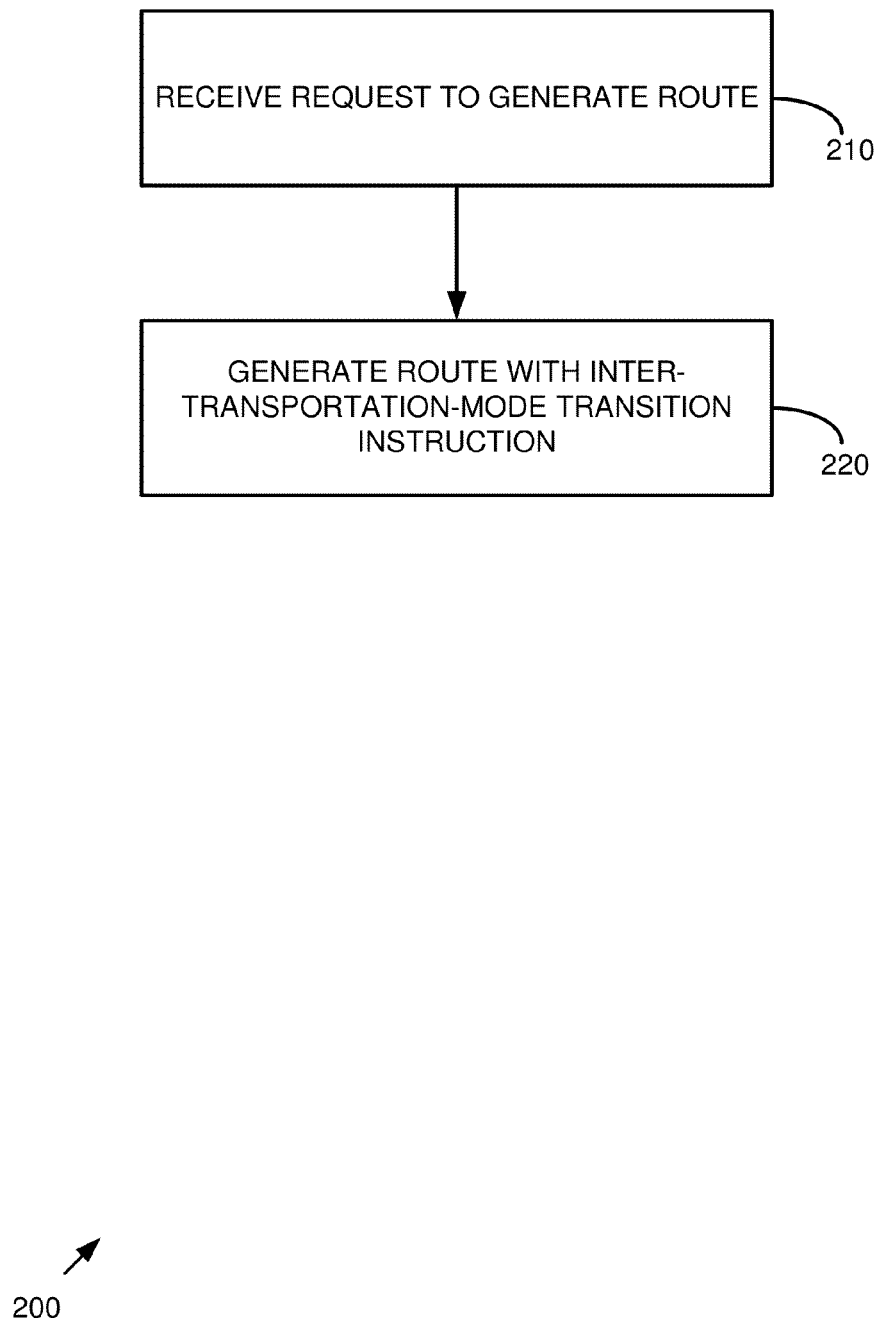
FIG. 2 is a flowchart of an example method of implementing inter-transportation-mode transitions.

FIG. 2 is a flowchart of an example method 200 of implementing inter-transportation-mode transitions and can be implemented, for example, in the system shown in FIG. 1.

The method 200 is typically performed as part of a request by a traveling user for directions from a mobile device. However, as described herein, fixed location implementations can also be supported. In practice, a list of instructions serving as directions for navigating to a destination location is then displayed for the traveler to follow.

At 210, a request to generate a route (e.g., from a start location to a destination location) is received. As described herein, a request can include or be associated with a starting location and a destination location. Other parameters, such as permitted or preferred modes can be included. In practice, a map, search, or other application can be used to initiate the request on behalf of a traveler who is contemplating a journey.

At 220, responsive to receiving the request, a route with an inter-transportation-mode transition instruction is generated. Any of the variety of inter-transportation-mode transition instructions described herein can be generated as part of the route. Although not necessary, a transition instruction can include reference to a visible landmark as described herein. The instruction can then be displayed on a mobile device for consideration by the traveler. In a mobile device scenario, the current location the mobile device can be tracked to determine whether it is off the route and update the instructions as the trip progresses.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4

Example Traveler-Centric Direction During Inter-Transportation-Mode Transition

Figure 3:
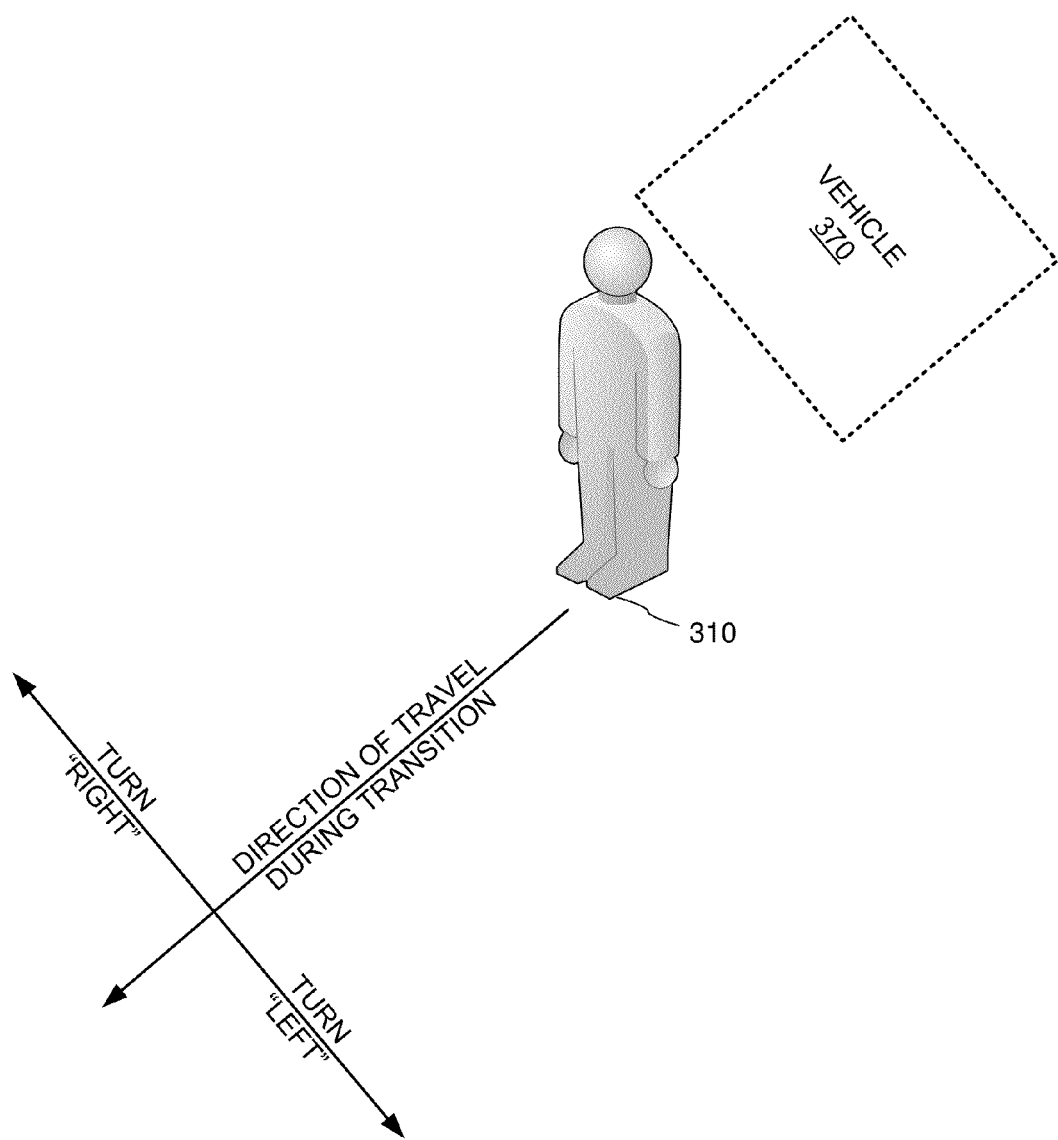
FIG. 3 is an illustration of a traveler-centric direction during an inter-transportation-mode transition.

FIG. 3 is an illustration of a traveler-centric direction (e.g., in which direction to proceed) during an inter-transportation-mode transition that can be used in any of the examples herein. In the example, a traveler 310 is traveling in a direction of travel during a transition from a first mode of transportation to a second mode of transportation. Scenarios involving a vehicle 370 can be supported. For example, when getting off a bus and beginning to walk, the traveler 310 steps off the bus and puts feet on the ground during the transition. A traveler-centric description of a direction to proceed during a transition can be specified during a transition, and such traveler-centric descriptions can be particularly helpful when transitioning to walking.

Directions can be specified in a traveler-centric way during the transition. Although street names can be included, a direction can be specified without containing a reference to, without being with respect to, or without being relative to a street or sidewalk.

As described herein, such directions can involve a change in direction (e.g., turning left or turning right as perceived by the traveler during the transition).

A compass-free direction can be supported to alleviate the traveler 310 from having to know or discover a current compass orientation or desired compass direction. Such a direction can also be called "immediately discernable" because the traveler need not integrate additional information (e.g., as opposed to a compass-based direction such as "go south," it is inherently known without looking around or knowing a current orientation which way to go based on the instruction "turn left").

Example 5

Example Direction During Inter-Transportation-Mode Transition

In any of the examples herein, a direction to proceed during a transition can be based on an implied orientation (e.g., of the traveler) during the transition (e.g., based on the transition type). As described herein, an internal representation of a map or route can take advantage of an implied orientation and known information to specify a transition more immediately discernable to a traveler.

Non-straight (e.g., "left" or "right") directions can be specified as described herein so that a direction to proceed comprises a change in direction (e.g., for the traveler).

As described herein, vehicle-centric descriptions of a direction to proceed (e.g., when not in the vehicle) can be included in a route. Such descriptions can be helpful for providing instructions after exiting a vehicle (e.g., "walk toward the front of the train").

Example 6

Example Routes

In any of the examples herein, a route comprising an ordered list of instructions can specify how to navigate from a starting location to a destination location. The route can be communicated to a traveler by displaying, electronically speaking, or otherwise imparting a list of instructions to the traveler.

A wide variety of other functionality can be supported, such as determining whether a traveler is off-route, listing the remaining travel time, and the like.

Example 7

Example Transportation Modes

In any of the examples herein, supported transportation modes can take any of a wide variety of forms used by travelers for transportation. For example, transportation modes such as bicycling, driving, walking, bus, subway, tram, streetcar, train, ferry, taxi, or the like can be supported. Transit forms of transportation modes can include public transit, public transportation, as well as privately managed transit and the like.

Emphasis is placed on walking in some examples because specialized instructions to walking travelers are typically quite helpful. Also, transitions between other transportation modes are rare in practice. However, the technologies can be applied to any number of transitions (e.g., driving onto ferry or the like), including those involving driving and those not involving driving.

Example 8

Example Landmark

In any of the examples herein, a description of a landmark can be included in a transition instruction and can take the form of any visible landmark. Such a landmark can assist a traveler by providing both direction and reassurance that travel is proceeding on the route.

Landmarks can take the form of restaurants, museums, bridges, monuments, statues, buildings, or the like.

Signs or signage descriptions can similarly be included in the transition instruction.

Example 9

Example Inter-Transportation-Mode Transitions

In any of the examples herein, an inter-transportation-mode transition (or "multimode transition") can be any transition from one transportation mode to another (e.g., different) transportation mode (e.g., walking to bus, bus to walking, and the like). Such transitions can often involve one or more decisions to be made by the traveler. Therefore, accurate, immediately discernable instructions can be very helpful in avoiding travel errors (e.g., walking the wrong way after exiting a bus or other transit vehicle) and providing an overall superior user experience for travelers.

The level of granularity supported for transitions can be adapted as appropriate for the circumstances. For example, transferring from one bus to another can be treated as a transition from bus to walking and back to bus, if an actual change of bus is required. In some cases, a single bus may serve the role of two bus lines. Although not strictly an inter-modal transition, a message can be included in the route to avoid confusion (e.g., "stay on the bus to transition to the red line").

Example 10

Example Inter-Transportation-Mode Transition Involving a Bus

Figure 4:
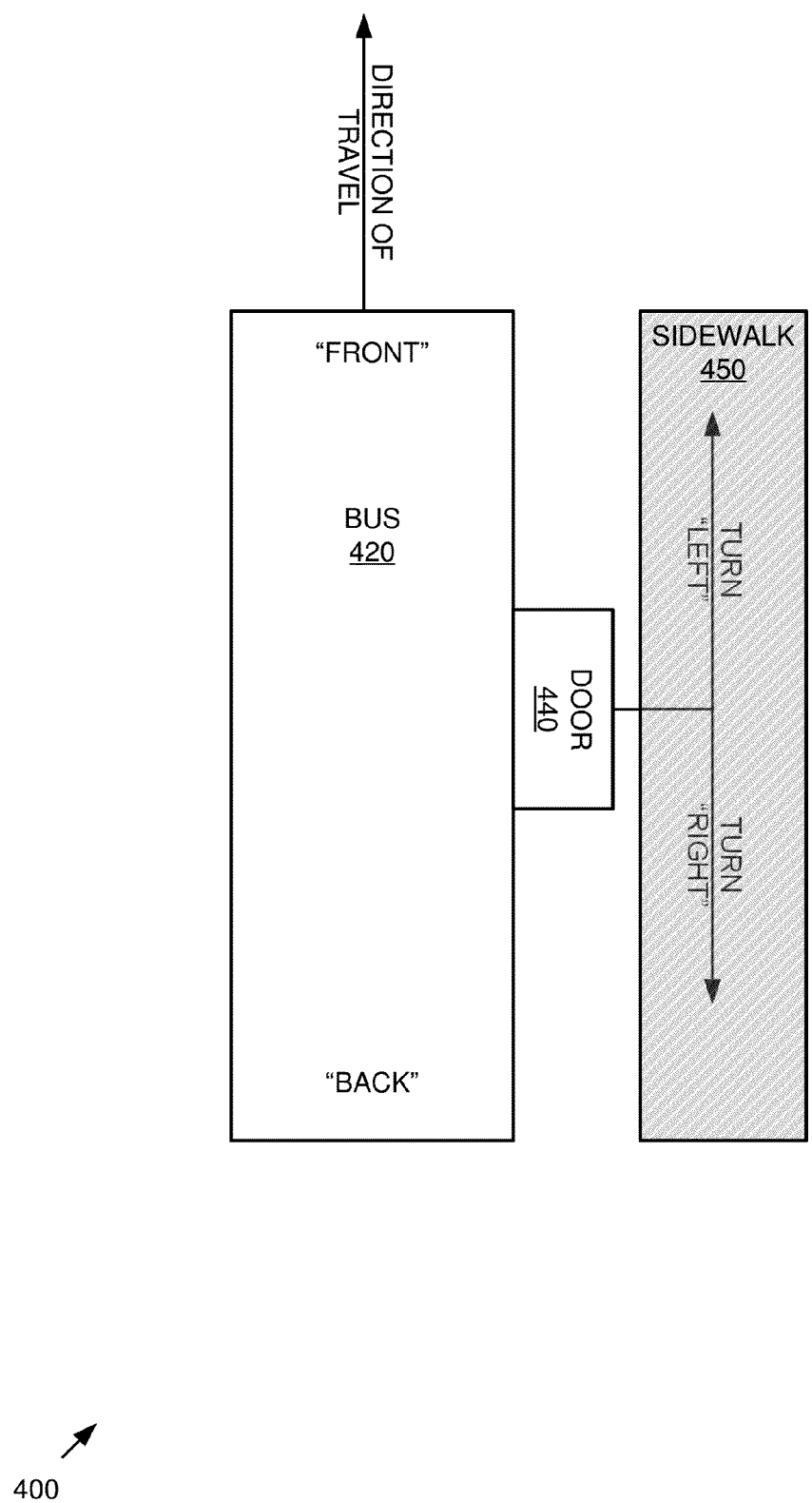
FIG. 4 is a block diagram of an example inter-transportation-mode transition involving a bus.

FIG. 4 is a block diagram of an example inter-transportation-mode transition scenario 400 involving a bus 420. Although a bus (e.g., conventional bus, tram, or the like) is used as an example, the technologies can be applied to any vehicle having a door.

As shown, the bus is associated with a direction of travel (e.g., whether or not the bus is moving). A "front" and "back" of the bus can also be determined thereby. Thus, vehicle-centric directions can also be specified as desired, even if the traveler is not in the vehicle.

A door 440 need not be explicitly represented or described, but is useful for illustration purposes. When a traveler exits the door 440 during an inter-transportation-mode transition, the direction "left" is to the front of the bus 420, and the direction "right" is to the back of the bus 420. Thus, compass-free, traveler-centric directions can be specified as part of a transition.

Although some examples herein assume a particular configuration of a vehicle with respect to an exit or entry point of a vehicle, in practice, other configurations can be supported. For example, in some countries or areas, the opposite directions may be used because passengers exit on the other side of the bus. And regardless of the country or area, a particular vehicle, stop, station, or route can be associated with a different transition configuration (e.g., a vehicle that stops on the opposite side of the street, stops at a dedicated platform or track, or the like). Such a configuration can be internally represented and associated with a vehicle, stop, station, or route so that accurate instructions can be generated. A default configuration (e.g., buses in the United States stop on the right side of the street) can be implemented and may be useful to reduce storage needs.

Thus, "straight" from the perspective of the bus driver can be described as "left" for a traveler transitioning to walking by exiting the bus 420.

For purposes of orientation, a sidewalk 450 is shown, but it need not be explicitly represented or present.

Example 11

Figure 5:
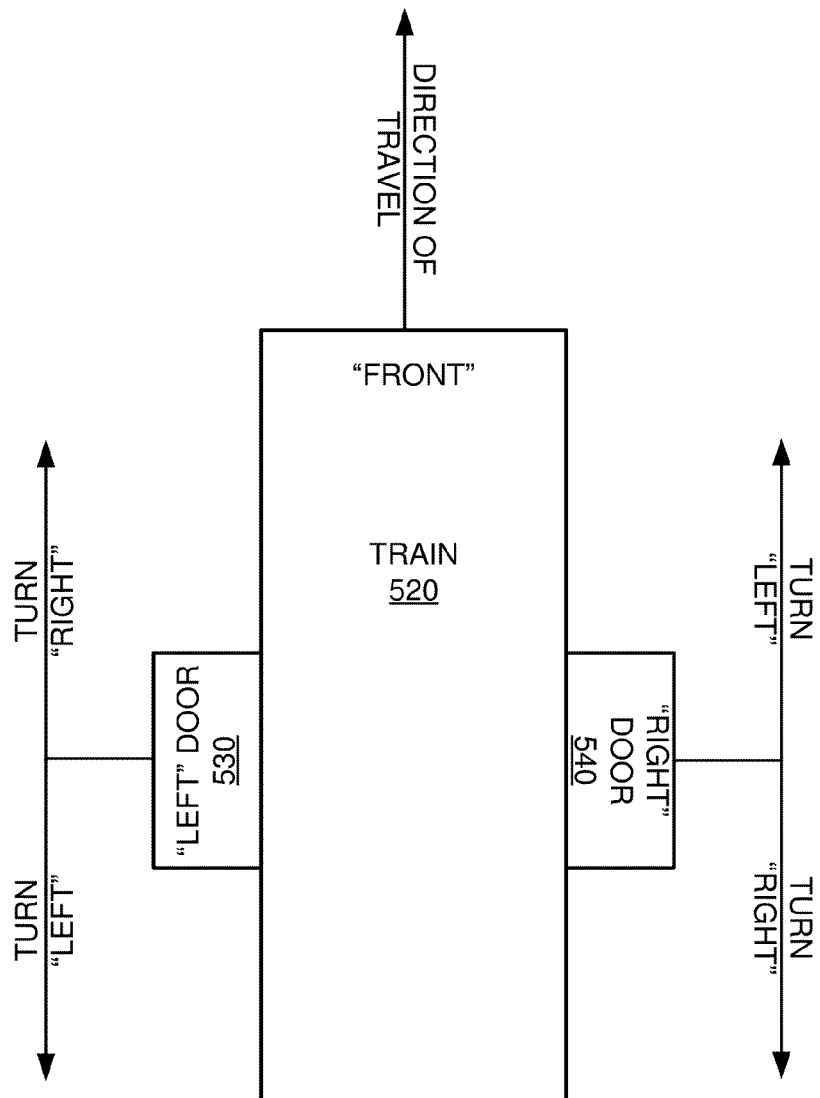
FIG. 5 is a block diagram of an example inter-transportation-mode transition involving a train.

Example Inter-Transportation-Mode Transition Involving a Vehicle with Multiple Doors FIG. 5 is a block diagram of an example inter-transportation-mode transition involving a train. Although a train (e.g., conventional train, light rail, subway car, streetcar, or the like) is used as an example, the technologies can be applied to any vehicle having more than one door. Similarly, although doors are shown, the technologies can be applied to situations involving more than one platform (e.g., by using the term "platform" instead of or in addition to "door").

As with the bus, the train 520 is associated with a direction of travel and a "front" and "back." Thus, vehicle-centric directions can be specified, even if the traveler is not in the vehicle (e.g., "get off the subway on the left side and walk towards the front of the train").

In the example, there are two doors, a left door 530 and a right door 540. Internal representations for a map can indicate which door is associated with a transition (e.g., when exiting the train and walking). An instruction can specify which of the doors are involved (e.g., "get off the subway on the left side"). Instead of using a door instruction, a platform-based instruction can be used (e.g., "get off the subway on the left platform and turn left").

So, when generating a route, an instruction can be generated indicating a particular door out of a plurality of possible doors for a vehicle. In cases where such doors are opened simultaneously, the traveler is forced to make a choice regarding which door to use (e.g., enter or exit). Therefore, such instructions can be helpful for guiding during a transition involving such a vehicle.

As described herein, the doors can comprise a right side of a vehicle and a left side of the vehicle (e.g., determined as facing in the direction of travel (forward) of the vehicle). The instruction can include which way to go after exiting the vehicle.

Example 12

Example Door of a Vehicle

In any of the examples herein, a door of vehicle can take the form of a door, set of doors, or other mechanism for boarding or alighting a vehicle. For purposes of communication, the door can be referred to as a "side" or "exit" of the vehicle (e.g., "exit the left side of the streetcar" or "get out using the left exit"). In situations where more than one door is available per side with differentiation between them, a single logical door can be used and represented for simplification.

If there is only one side or platform, designations such as "left" and "right" can be omitted or implied.

As described herein, descriptions can incorporate platforms instead of or in addition to doors.

Example 13

Example Inter-Transportation-Mode Transition Involving a Station with Multiple Portals In any of the examples herein, a transition instruction can include a specification of a specific portal (e.g., entry, exit, or the like) out of a plurality of possible portals to a transit station (e.g., train station, subway station, or the like).

For a plurality of possible portals of a station, an instruction indicating a particular portal out of the possible portals can be generated.

Example 14

Example Inter-Transportation-Mode Transition Involving Transit Pickup/Dropoff

In any of the examples herein, a transition instruction can include a specification of a pickup or dropoff point for transportation (e.g., a bike share).

For example, "Rent a bike at the bike share and continue down Boren Ave in the same direction" can specify that a traveler is to pickup a bicycle at a bike share. Another instruction involving drop off is "Drop your bike at the bike share station and walk toward the ABC Restaurant."

Example 15

Example Conversion into Description

Figure 6:
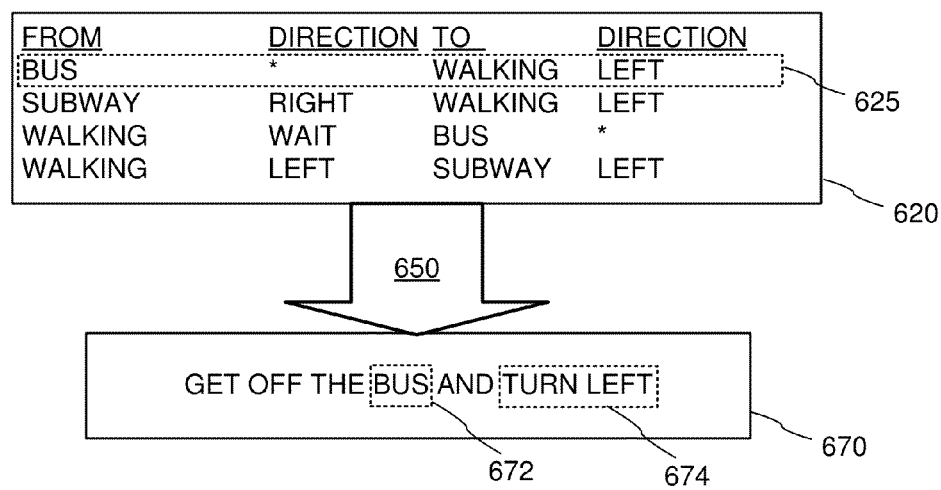
FIG. 6 is a block diagram of a system converting an internal representation of an inter-transportation-mode transition into a description suitable for inclusion in an instruction for a route.

FIG. 6 is a block diagram of a system 600 converting an internal representation 625 of an inter-transportation-mode transition into a description 670 suitable for inclusion in an instruction for a route. Such an internal representation 625 can be stored in or derived from a map representation as described herein.

In the example, internal representations 620 of inter-transportation-mode transitions (e.g., information about inter-transportation-mode transitions) include a "from" transportation mode and direction and a "to" transportation mode and direction. In practice, other information can be included (e.g., whether a platform is involved or the like). For some fields, a direction may be impossible or implied (e.g., when getting off the bus, it is only possible to exit one side of the bus), so a direction need not be specified.

For example, the internal representation 625 can be converted by a converter 650 to read "Get off the bus and turn left." In such situations, a transition to walking is indicated but need not be explicitly stated (e.g., it is known that a traveler begins walking after exiting the bus). However, it may be indicated as desired (e.g., by displaying an icon depicting a walking traveler).

In practice, any number of other verb choices can be used (e.g., "exit," "step off," or the like) instead of "get off."

As shown, the inter-transportation-mode transition can be specified without including reference to a street (e.g., "turn left").

A direction of "wait" can be supported for a traveler who is supposed to simply wait at the stop (e.g., "Get off the bus and wait at the stop for the red line bus").

For vehicles having more than one exit, a direction can indicate a door or platform (e.g., "Get off the subway on the right platform, and turn left").

The technology can thus go through the "from" and "to" descriptors and convert them into plain language descriptions in an instructional phrase to be included in a route. Templates can be used. For example, "bus" 672 is substituted as part of the "get off" message, and "turn left" 674 is substituted as what to do after exiting the bus. Multiple language support can be implemented.

Example 16

Example User Interface

Figure 7:
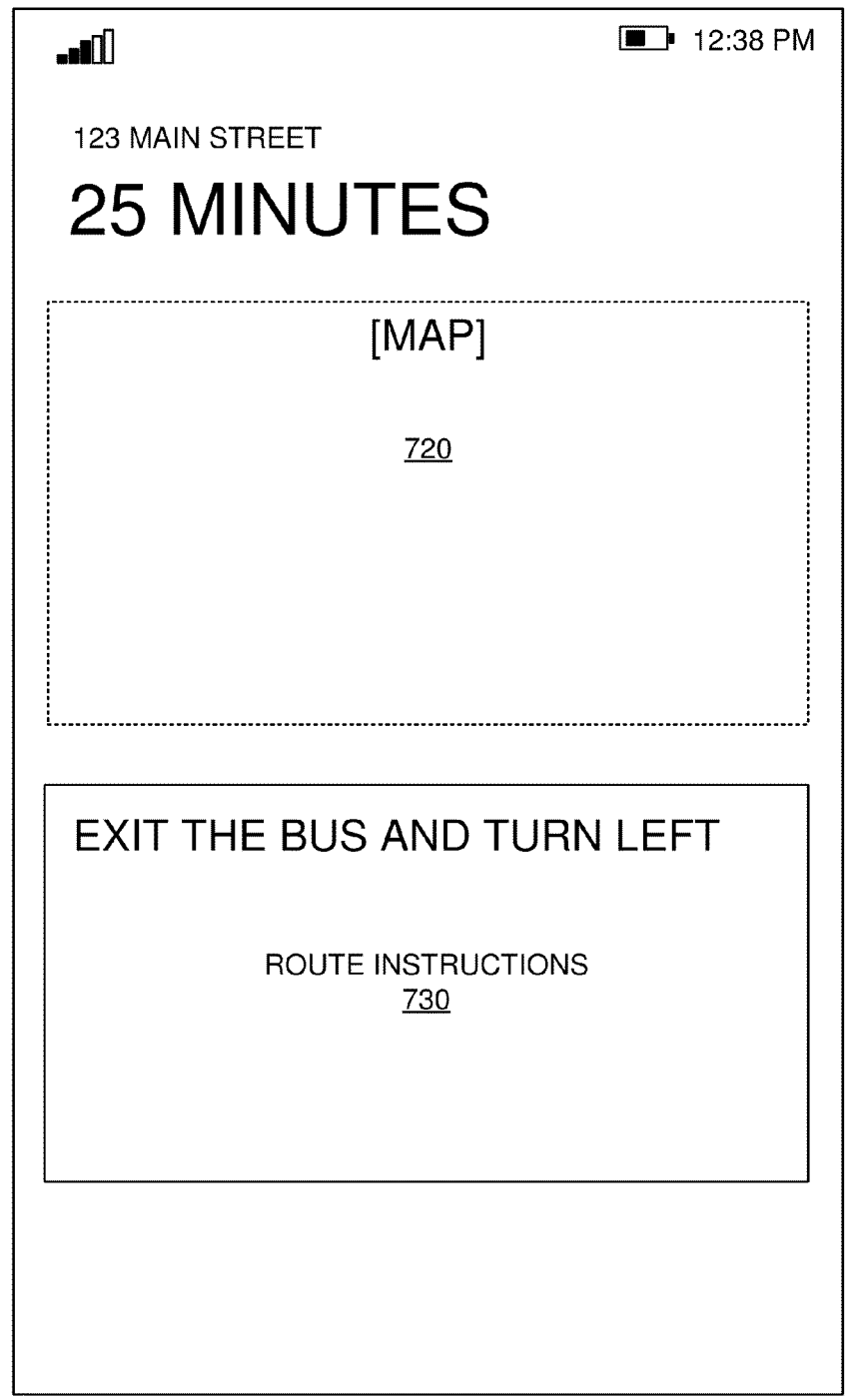
FIG. 7 is a wire frame of an example map user interface implementing an inter-transportation-mode transition.

FIG. 7 is a wire frame of an example map user interface 700 implementing an inter-transportation-mode transition. Such a user interface 700 can be used to display the instructions in the routes described herein. Any variety of other user interface techniques can be used, including spoken directions.

In the example, the route instructions 730 are displayed proximate a map 720.

Example 17

Example Internal Representation

Figure 8:
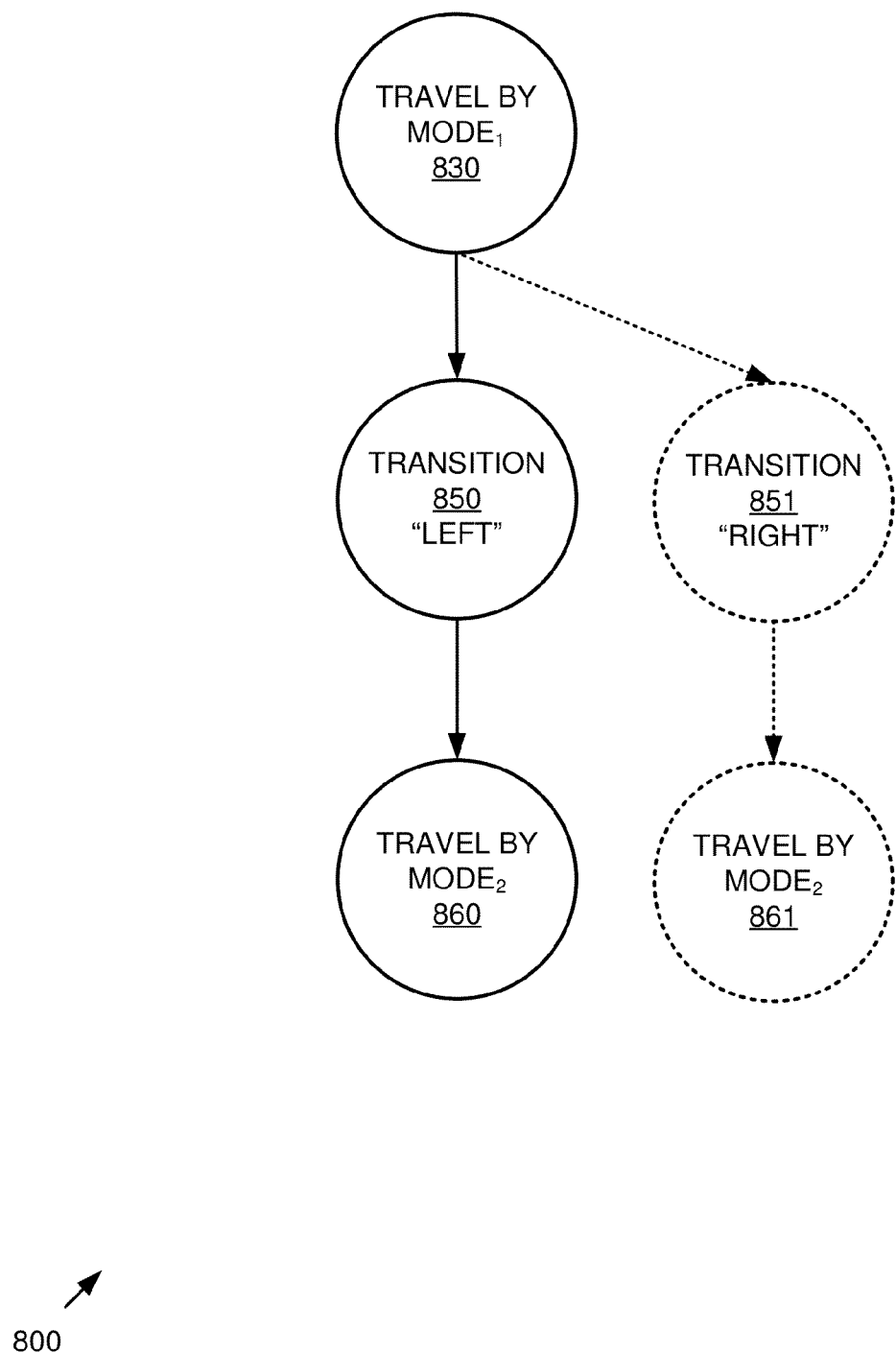
FIG. 8 is a block diagram of an example internal representation of a map or route incorporating an inter-transportation-mode transition.

FIG. 8 is a block diagram of an example internal representation 800 of a map or route incorporating an inter-transportation-mode transition.

In the example, nodes 830, 850, 851, 860, 861 are used to represent segments 830, 860, 861 of the journey and transitions 850, 851 between them. As described herein, various information can be included as part of transitions to assist when generating a description of the inter-transportation-mode transition.

In the case of a map, multiple transitions 850, 851 can be represented. Upon formulation of a route, a particular transition 850 can be chosen based on route criteria (e.g., the destination or the like). Subsequently, when the transition information is converted into a description, it can be presented for consideration by a traveler (e.g., "get off the bus and turn left").

For example, information about inter-transportation-mode transitions can include indications of a plurality of possible doors of a transit vehicle for an inter-transportation-mode transition to or from walking. Indications of a plurality of possible portals of a transit station for an inter-transportation-mode transition to or from walking can also be included. Indications of a plurality of possible platforms of a transit station for an inter-transportation-mode transition to or from walking can also be included (e.g., indicated in a vehicle-centric way). For example, an indication of a vehicle-centric direction for an inter-transportation-mode transition to walking when exiting a vehicle can be included.

The information can include an indication of a traveler-centric direction for an inter-transportation-mode transition to walking or enough information from which an implied traveler-centric direction can be determined as described herein.

Information can include an indication of waiting at a vehicle stop when transitioning to or from walking.

Such a representation of inter-transportation-mode transition can be particularly helpful because a direction can be specified without reference to a street, orientation, or compass direction (e.g. when exiting a bus). The street, orientation, or compass direction can be incorporated into the representation 800 (e.g., an implied orientation can be determined or otherwise used to determine whether the description should be "left" or "right"). In practice, such compass-free, traveler-centric descriptions can be incorporated into the representation 800, or such descriptions can be determined from legacy representations, depending on the scenario. Such a technique can be used to base a direction to proceed on an implied orientation (e.g., of a traveler) when exiting a transit vehicle. For example, it can be determined that a traveler exits the right side of a bus on a north/south street and therefore must be facing east during the transition (e.g., assuming the bus was driving north). Therefore, heading "north" after exiting the bus can be described as "turn left" because it is implied that the traveler is facing east, whether or not such a determination is explicitly made. For a vehicle having exits on two sides, orientation will vary depending on the exit that is involved (e.g., and specified as part of the instruction).

In some cases, legacy map data can be used to generate transition instructions. In some cases, supplemental information can be helpful. For example, if a bus stop is represented as a single entity, it may be that the bus stop is actually better represented as two entities (e.g., one for each side of the street). Thus, the representation better accommodates differentiation between the two stops, which appear as two different physical locations to a walking traveler.

Similarly, certain transit stations have complex combinations of stops, platforms, tracks, and the like. Representations can account for information needed to direct users to the proper track and which side of which track.

Entry points for transitions can be represented using a generic data structure that can accommodate different forms of transportation and transitions to/from a form of transportation. Such an entry point can represent a door of a bus, portal of a transit station, end of a bike path, or the like.

Landmark information can also be included in the representation 800, whether explicitly associated with nodes or impliedly associated with nodes due to determined proximity of a landmark (e.g., denoted as such) to a location associated with the transition (e.g., ABC Restaurant is within a threshold distance of a bus stop). Such a landmark can indicate a landmark for a transition to walking.

Example 18

Example Instructions

In any of the examples, instructions for inclusion in a route can take the form of an inter-transportation-mode transition instruction. Such an instruction can include words or phrases that specify how to transition from one mode of transportation to another. As described herein, a compass-free direction, a traveler-centric direction, a vehicle-centric direction, or combinations thereof can be included.

For example, when transitioning from bus to walking (e.g., exiting the bus), an instruction such as "Get off the bus and turn left" instructs the user to turn left when walking begins. The fact that the user is transitioning to walking need not be explicitly described because it can be assumed that a traveler transitions to walking when exiting the bus. Similarly, while the user is technically walking while in the bus, the mode of transportation is considered to be "bus" because the user is using the bus for transportation during the bus leg of the route.

Transitions involving transitioning from a vehicle stopped at a location having multiple possible platforms can include an instruction such as "Get off the train on the right-hand platform and then turn left." In such a case, the "right-hand" direction can be taken with respect to the direction of travel (e.g., forward travel is considered to be in the straight direction). Similarly to the bus example, the fact that the user is transitioning to walking need not be explicitly described.

Transitions can include vehicle-centric descriptions of directions, even though the traveler is no longer in the vehicle at the time the instruction is to be implemented. For example, "Get off the subway on the left-hand platform and walk toward the front of the train" provides clear direction to the traveler without using a compass direction or left or right.

Waiting can also be supported as part of transitioning to walking. For example, "Get off the 545 bus at Bellevue & E. Olive and wait at the stop for the 43 bus towards U District" instructs a traveler to wait.

Walking- or cycling-specific navigation such as "cross the street" or "cross the square" can also be supported. For example, "Cross the street and wait in front of the ABC Restaurant for the bus" incorporates "cross the street" as well as a landmark to assist in the transition. "At the end of the bike trail, turn left and cross the street to get to the bus stop" is another example.

Transitions from bicycle to bus can also be accommodated. For example, "Put your bike on the front of the bus" can specify such a transition.

Stations with multiple portals can be described with portal-specific information. For example, "Enter the subway station at the Park Street entrance to catch the Red line towards Alewife" assists the traveler in a transition by specifying which entrance of the station should be entered.

Similarly, a portal can be specified from an exit perspective. For example, "Get off the subway at the Davis Square stop and exit the station towards Holland St." guides a traveler making a transition from subway to walking (e.g., walking within the subway station, and then walking outside the station). In any scenario involving multiple portals, the incorrect portal can be included to alleviate confusion (e.g., "Get off the train at the Davis stop and exit the subway station via the College Ave exit (as opposed to the exit towards Holland St.)").

In addition to landmarks, signage can be included in the instruction. For example, "Get off the Red Line at Park Street Station and follow the signs to the Green Line towards Lechmere Station" uses signage as part of a transition from transit vehicle to walking and then sets up for a transition from walking to transit vehicle.

In practice, an instruction can take the form of a compound instruction. For example, "Get off the subway at the Davis Square stop and exit the station towards Holland St. Then cross Davis Square and wait in front of XYZ Restaurant for the 28 bus towards Porter Square" can accomplish multiple inter-transportation-mode transitions and also includes landmark information.

Any of the inter-transportation-mode transition instructions described herein can be generated as immediately discernable (e.g., without reference to a compass direction).

Context-free inter-transportation-mode transition instructions can also be supported in that a traveler need only have information inherently available to a traveler (e.g., traveler-centric directions such as "left"), regardless of whether she is aware of a location or surroundings.

Example 19

Example Advantages

As described herein, users can easily take advantage of generated instructions to arrive a desired destination without having to be concerned with compass orientation.

Because a traveler need not figure out or be given current orientation, bandwidth and computing time for communicating such information to a user can be avoided. Also, errors in navigation are reduced (e.g., for a traveler who goes in the wrong direction and then needs additional instructions to get back on route).

Example 20

Example Computing Systems

Figure 9:
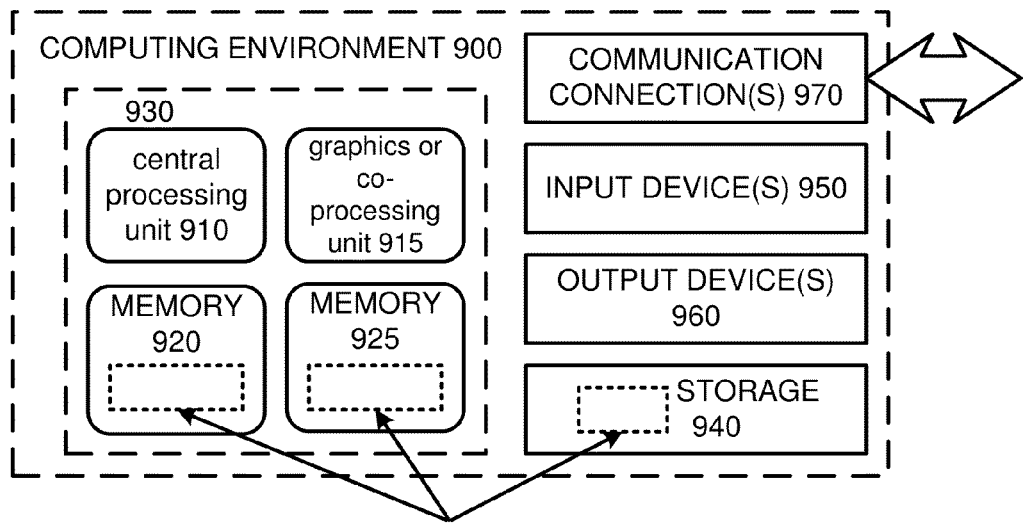
FIG. 9 is a diagram of an example computing system in which some described embodiments can be implemented.

FIG. 9 illustrates a generalized example of a suitable computing system or environment 900 in which several of the described innovations may be implemented. The computing system 900 is not intended to suggest any limitation as to scope of use or functionality, as the innovations may be implemented in diverse general-purpose or special-purpose computing systems. A communication device as described herein can take the form of the described computing system 900.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system 900, computer-readable media include memory 920, 925, storage 940, and combinations of any of the above.

The innovations can be described in the general context of computer-executable instructions, such as those included in program modules, being executed in a computing system on a target real or virtual processor (e.g., which is ultimately executed in hardware). Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 21

Example Mobile Device

Figure 10:
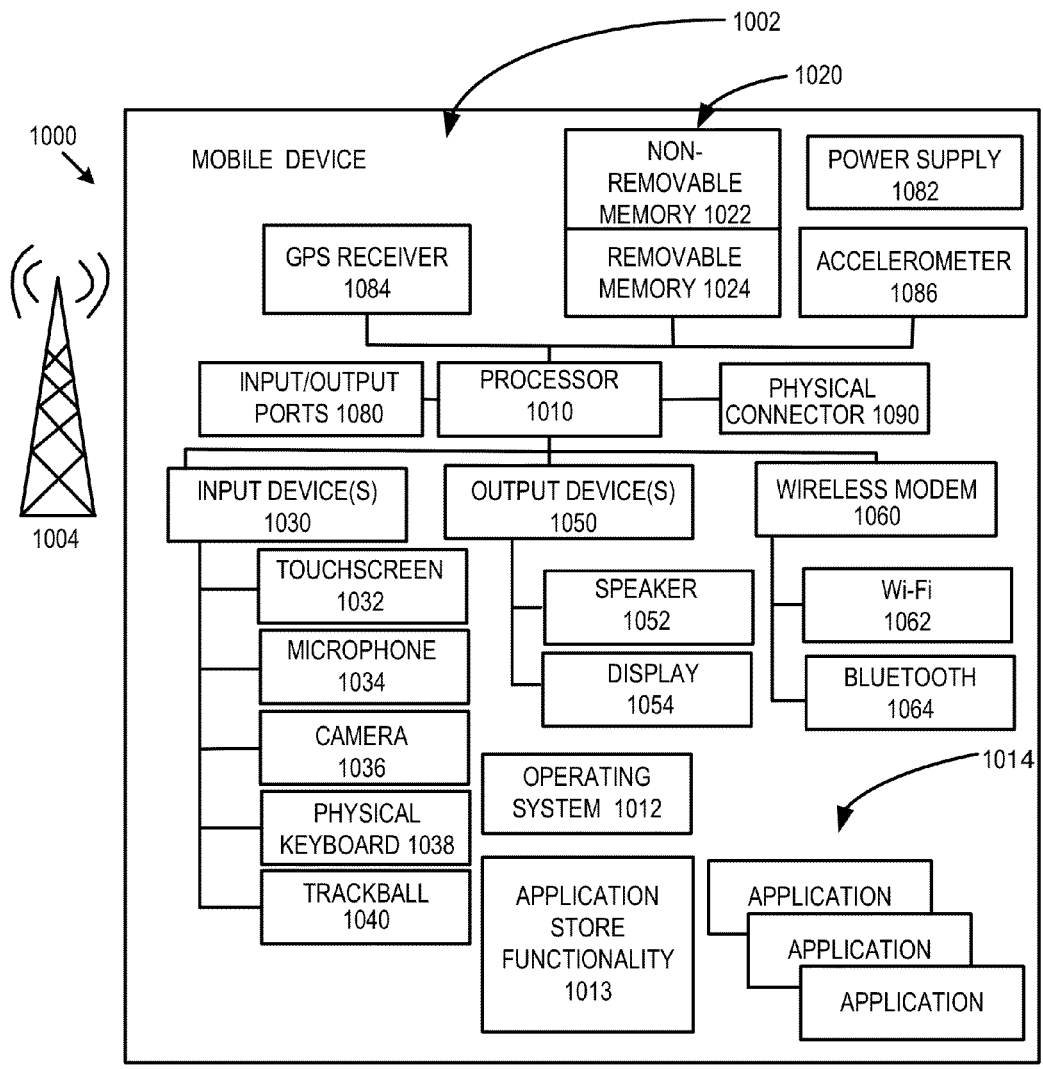
FIG. 10 is an example mobile device that can be used for the technologies described herein.

In any of the examples herein, a communication device can take the form of a mobile device. FIG. 10 is a system diagram depicting an example mobile device 1000 including a variety of optional hardware and software components, shown generally at 1002. Any components 1002 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1004, such as a cellular, satellite, or other network. Voice over IP scenarios (e.g., over WiFi or other network) can also be supported. The communication devices described herein can take the form of the described mobile device 1000.

The illustrated mobile device 1000 can include a controller or processor 1010 (e.g., signal processor, microprocessor, ASIC, or other control and processing logic circuitry) for performing such tasks as signal coding, data processing, input/output processing, power control, and/or other functions. An operating system 1012 can control the allocation and usage of the components 1002 and support for one or more application programs 1014. The application programs 1014 can include common mobile computing applications (e.g., email applications, calendars, contact managers, web browsers, messaging applications), or any other computing application. Functionality 1013 for accessing an application store can also be used for acquiring and updating applications 1014.

The illustrated mobile device 1000 can include memory 1020. Memory 1020 can include non-removable memory 1022 and/or removable memory 1024. The non-removable memory 1022 can include RAM, ROM, flash memory, a hard disk, or other well-known memory storage technologies. The removable memory 1024 can include flash memory or a Subscriber Identity Module (SIM) card, which is well known in GSM communication systems, or other well-known memory storage technologies, such as "smart cards." The memory 1020 can be used for storing data and/or code for running the operating system 1012 and the applications 1014. Example data can include web pages, text, images, sound files, video data, or other data sets to be sent to and/or received from one or more network servers or other devices via one or more wired or wireless networks. The memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1000 can support one or more input devices 1030, such as a touch screen 1032, microphone 1034, camera 1036, physical keyboard 1038 and/or trackball 1040 and one or more output devices 1050, such as a speaker 1052 and a display 1054. Other possible output devices (not shown) can include piezoelectric or other haptic output devices. Some devices can serve more than one input/output function. For example, touchscreen 1032 and display 1054 can be combined in a single input/output device.

A wireless modem 1060 can be coupled to an antenna (not shown) and can support two-way communications between the processor 1010 and external devices, as is well understood in the art. The modem 1060 is shown generically and can include a cellular modem for communicating with the mobile communication network 1004 and/or other radio-based modems (e.g., Bluetooth 1064 or Wi-Fi 1062). The wireless modem 1060 is typically configured for communication with one or more cellular networks, such as a GSM or CDMA network for data and voice communications within a single cellular network, between cellular networks, or between the mobile device and a public switched telephone network (PSTN).

The mobile device 1000 can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components 1002 are not required or all-inclusive, as any components can be deleted and other components can be added.

Example 22

Example Cloud-Supported Environment

Figure 11:
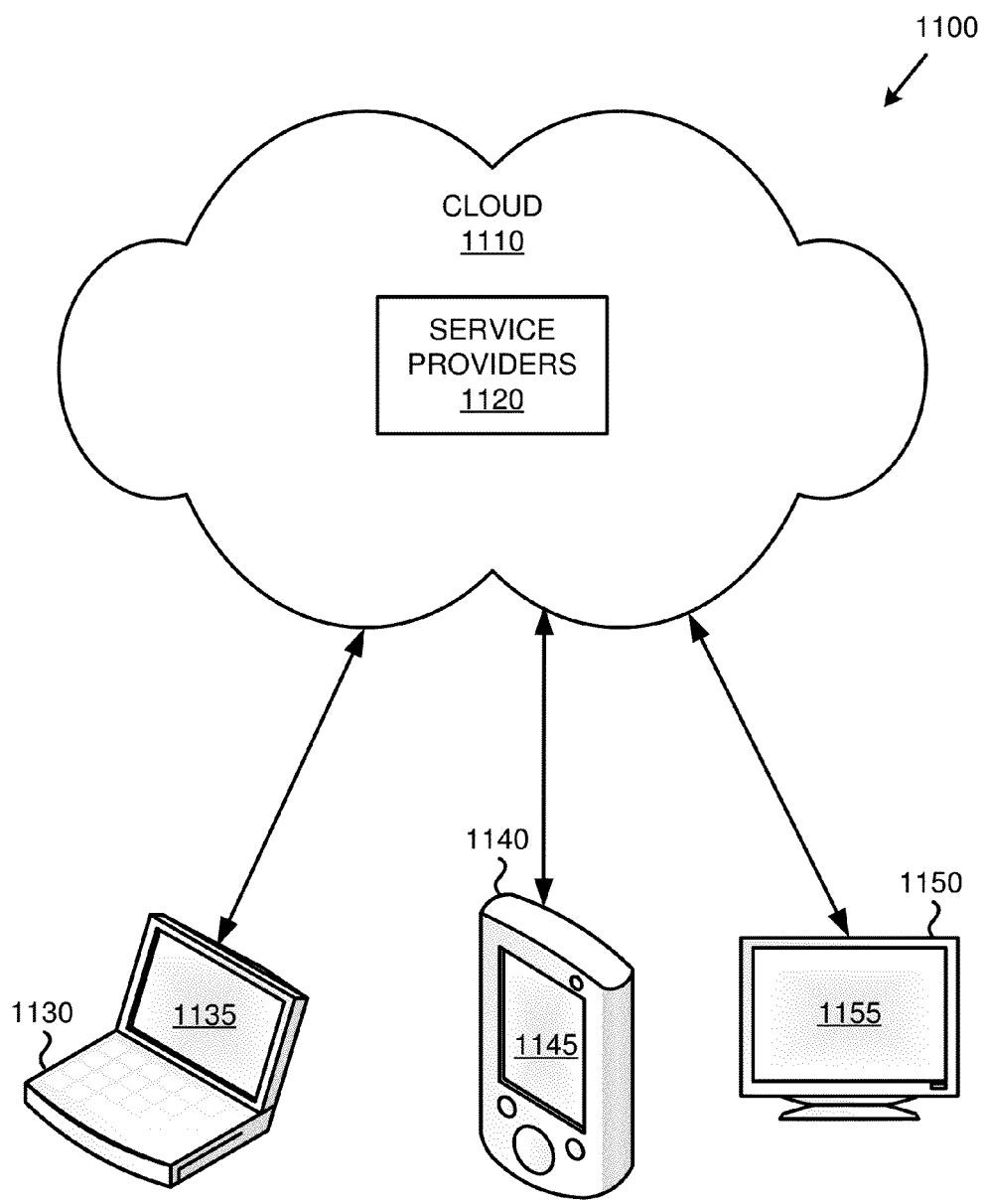
FIG. 11 is an example cloud-support environment that can be used in conjunction with the technologies described herein.

In example environment 1100 of FIG. 11, the cloud 1110 provides services for connected devices 1130, 1140, 1150 with a variety of screen capabilities. Connected device 1130 represents a device with a computer screen 1135 (e.g., a mid-size screen). For example, connected device 1130 could be a personal computer such as desktop computer, laptop, notebook, netbook, or the like. Connected device 1140 represents a device with a mobile device screen 1145 (e.g., a small size screen). For example, connected device 1140 could be a mobile phone, smart phone, personal digital assistant, tablet computer, and the like. Connected device 1150 represents a device with a large screen 1155. For example, connected device 1150 could be a television screen (e.g., a smart television) or another device connected to a television (e.g., a set-top box or gaming console) or the like. One or more of the connected devices 1130, 1140, 1150 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touch screen capability of a particular connected device (e.g., connected devices 1130, 1140, 1150).

In example environment 1100, the cloud 1110 provides the technologies and solutions described herein to the various connected devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users).

Example 23

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Non-Transitory Computer-Readable Media

Any of the computer-readable media herein can be non-transitory (e.g., memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computing system to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I therefore claim as my invention all that comes within the scope and spirit of the claims.

What is claimed is:

1. A method implemented at least in part by a computing device, the method comprising:
   storing an internal representation of an inter-transportation-mode transition between a first mode of transportation and a second, different mode of transportation, wherein the internal representation is stored in or derived from a map representation;
   receiving a request to generate a route from a starting location to an ending location;
   in response to the request, generating the route, the route comprising a plurality of transportation modes and an inter-transportation-mode transition instruction comprising a compass-free direction to proceed for the inter-transportation-mode transition from the first mode of transportation to the second, different mode of transportation, wherein the internal representation of the inter-transportation-mode transition represents exiting a transit vehicle and the compass-free direction to proceed as a compass-free direction to turn after exiting the transit vehicle, wherein generating the route comprises converting the internal representation of the inter-transportation-mode transition into the inter-transportation-mode transition instruction, and wherein the inter-transportation-mode transition instruction comprises the compass-free direction to turn after exiting the transit vehicle when transitioning from the transit vehicle to walking; and
   displaying or electronically speaking the inter-transportation-mode transition instruction.

2. The method of claim 1 wherein the direction to proceed is based on an implied orientation during the transition.

3. The method of claim 1 wherein the direction to proceed is based on an implied orientation after exiting the transit vehicle.

4. The method of claim 1 wherein the direction to proceed comprises a traveler-centric description of the direction to proceed during the transition.

5. The method of claim 4 wherein the direction to proceed comprises a change in direction.

6. The method of claim 1 wherein the direction to proceed comprises a vehicle-centric description of the direction to proceed when not inside the transit vehicle.

7. The method of claim 1 wherein the direction to proceed comprises an instruction to cross a street.

8. The method of claim 1 wherein generating the route comprises:
   for a plurality of possible doors of the transit vehicle, generating an instruction indicating a particular door out of the possible doors.

9. The method of claim 8 wherein the plurality of possible doors comprise a right side of the transit vehicle and a left side of the transit vehicle.

10. The method of claim 1 wherein the transition instruction comprises reference to a visible landmark.

11. The method of claim 1 wherein generating the route comprises:
   for a plurality of possible portals of a station, generating an instruction indicating a particular portal out of the possible portals.

12. The method of claim 1 further comprising:
   storing an internal representation of a map representing a plurality of inter-transportation-mode transitions as transition nodes, wherein an inter-transportation-mode transition is represented as a transition node between a first segment node of a first transportation mode and a second segment node of a second, different transportation mode;
   wherein generating the route comprises choosing a particular transition node out of the transition nodes based on the ending location.

13. The method of claim 12 wherein:
   the internal representation represents an entry point for the inter-transportation-mode transition with an entry point data structure; and
   the entry point data structure is generic to representation of a door of a bus, a portal of a transit station, and an end of a bike path.

14. The method of claim 1 wherein the method further comprises:
   determining a current location of the computing device with a Global Positioning System receiver; and
   using the current location of the computing device as the starting location.

15. A system comprising:
   in one or more computer-readable media, a stored representation of a map comprising information about an inter-transportation-mode transition;
   an internal representation of an inter-transportation-mode transition between a first transportation mode and a second, different transportation mode, wherein the internal representation is stored in or derived from the stored representation of the map;
   a route generator configured to accept a starting location and destination location, wherein the route generator is further configured to read the stored representation of the map and generate a route from the starting location to the destination location, wherein the route generator is further configured to, based on the internal representation of the inter-transportation-mode transition and a template describing exiting a transit vehicle, output a description of the route comprising an inter-transportation-mode transition instruction comprising a compass-free direction to proceed for a transition from a first mode of transportation to a second, different mode of transportation, wherein the compass-free direction indicates a direction to turn after exiting the transit vehicle when transitioning from the transit vehicle to walking; and
   an output device configured to display or electronically speak the inter-transportation-mode transition instruction.

16. The system of claim 15 wherein:
   the internal representation of the inter-transportation-mode transition comprises indications of a plurality of possible doors of the transit vehicle for an inter-transportation-mode transition to or from walking.

17. The system of claim 15 wherein:
   the internal representation of the inter-transportation-mode transition comprises indications of a plurality of possible platforms of a transit station for an inter-transportation-mode transition to or from walking.

18. The system of claim 15 wherein:
   the internal representation of the inter-transportation-mode transition comprises an indication of a vehicle-centric direction.

19. The system of claim 15 wherein:
   the internal representation of the inter-transportation-mode transition comprises an indication of a landmark for a transition to walking.

20. The system of claim 15 further comprising:
a Global Positioning System receiver configured to determine a current location of a mobile device;
wherein the route generator is configured to accept the current location of the mobile device as the starting location.

21. One or more computer-readable memories, magnetic storage media, or optical storage media comprising computer-executable instructions causing a computing system to perform a method comprising:
for an inter-transportation-mode transition from a first mode of transportation to a second, different mode of transportation, generating an instruction for inclusion in a route from a starting location to a destination location, wherein generating the instruction comprises:
from an internal representation of the inter-transportation-mode transition storing the first mode of transportation, the second, different mode of transportation, an indication of one out of a plurality of possible open sides of a vehicle through which to exit, and a traveler-centric indication of a direction to travel while walking after exiting the vehicle, wherein the direction to travel is based on an implied orientation of a traveler exiting from the indicated open side of the vehicle, generating the indication of the one out of the plurality of possible open sides of the vehicle through which to exit;
generating the traveler-centric indication of the direction to travel while walking after exiting the vehicle; and
substituting the indication of the one out of the plurality of possible open sides of the vehicle through which to exit and the traveler-centric indication of the direction to travel while walking after exiting the vehicle into a template for the instruction; and
displaying or electronically speaking the instruction.

\* \* \* \* \*